(No Model.) 3 Sheets—Sheet 1.

J. K. PROCTOR.
TOBACCO DRYING AND ORDERING APPARATUS.

No. 540,271. Patented June 4, 1895.

(No Model.) 3 Sheets—Sheet 3.
J. K. PROCTOR.
TOBACCO DRYING AND ORDERING APPARATUS.

No. 540,271. Patented June 4, 1895.

Witnesses:
Thomas M. Smith.
Richard C. Maxwell.

Inventor.
Josiah K. Proctor,
By J. Walter Douglas
Attorney.

UNITED STATES PATENT OFFICE.

JOSIAH K. PROCTOR, OF PHILADELPHIA, PENNSYLVANIA, ASSIGNOR TO THE PHILADELPHIA TEXTILE MACHINERY COMPANY, OF SAME PLACE.

TOBACCO DRYING AND ORDERING APPARATUS.

SPECIFICATION forming part of Letters Patent No. 540,271, dated June 4, 1895.

Application filed October 1, 1894. Serial No. 524,563. (No model.)

*To all whom it may concern:*

Be it known that I, JOSIAH K. PROCTOR, a citizen of the United States, residing at the city of Philadelphia, in the county of Philadelphia and State of Pennsylvania, have invented certain new and useful Improvements in Apparatus for Treating, Curing, Cooling, and Ordering Tobacco, of which the following is a specification.

My invention has relation to apparatus for continuously treating, curing, cooling and ordering tobacco.

The principal objects of my invention are, first, to provide a simple and effective apparatus for drying out tobacco without blanching, curing the same to permit of a silky appearance being given thereto, cooling to bring to a condition for ordering without depriving the same of any of its sweetness, aroma or flavor and to permit of subsequent handling after removal from the apparatus with perfect safety and without fear of crushing or breaking the leaf, and, second, to provide an apparatus wherein by circulation and recirculation the treating, curing, cooling and ordering of tobacco are effected.

My invention stated in general terms consists of an apparatus having provisions wherein tobacco is continuously subjected to the influence of a highly heated circulating atmosphere to absorb moisture contained therein and to dry out the same without blanching, then to a circulating moderately heated atmosphere to cure the tobacco and bring the same to a healthy condition with a silky-like appearance and without depriving the same of any of its flavor or aroma, then cooling the tobacco at about a normal atmosphere and then ordering by subjecting to a circulation of induced humid atmosphere to cause the same to be brought to a condition for working or handling without crushing, crumbling or breaking the same.

The nature, objects, and scope of my invention will be more fully understood from the following description taken in connection with the accompanying drawings, forming part hereof, in which—

Figure 1:
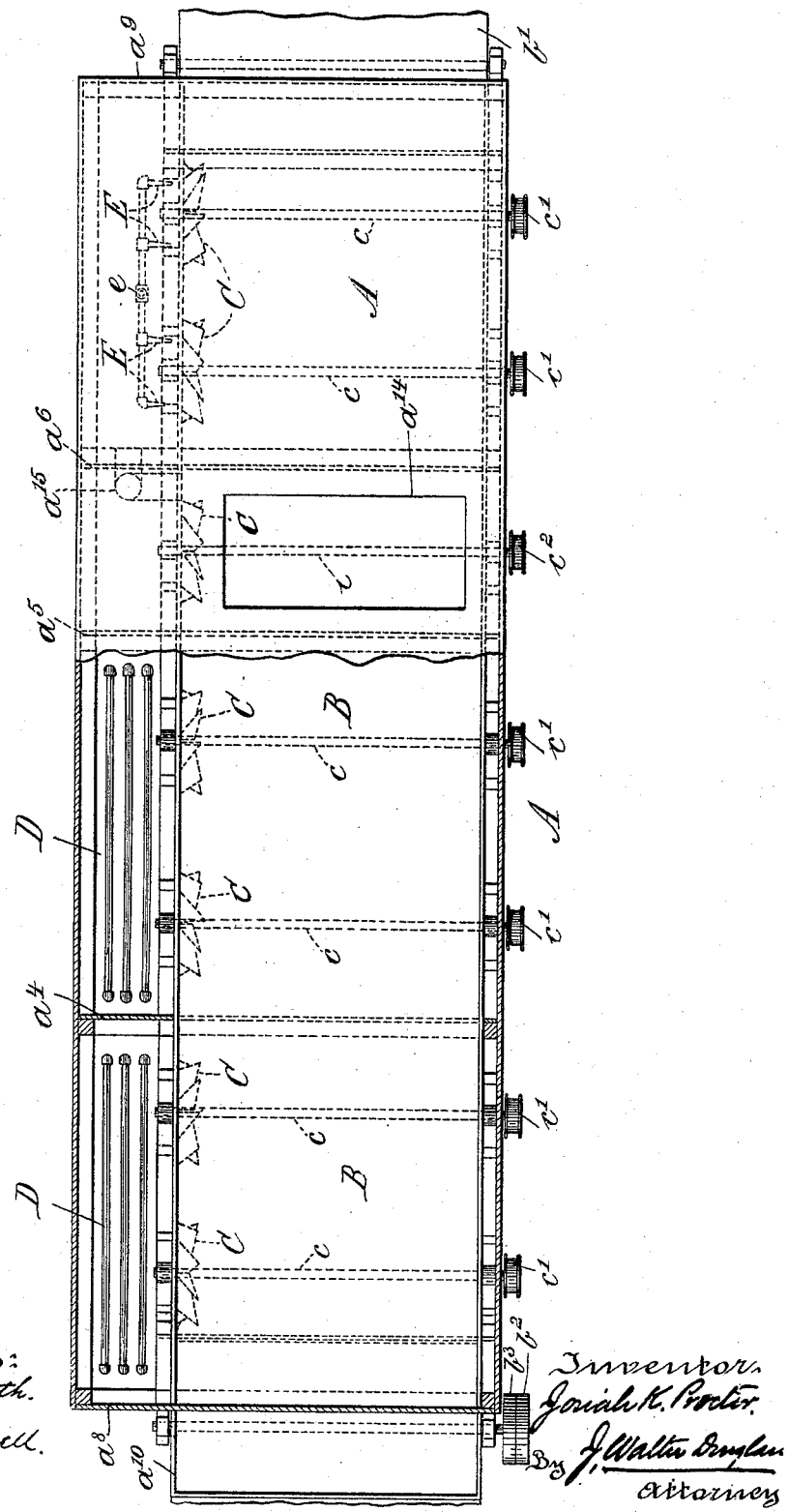
Figure 2:
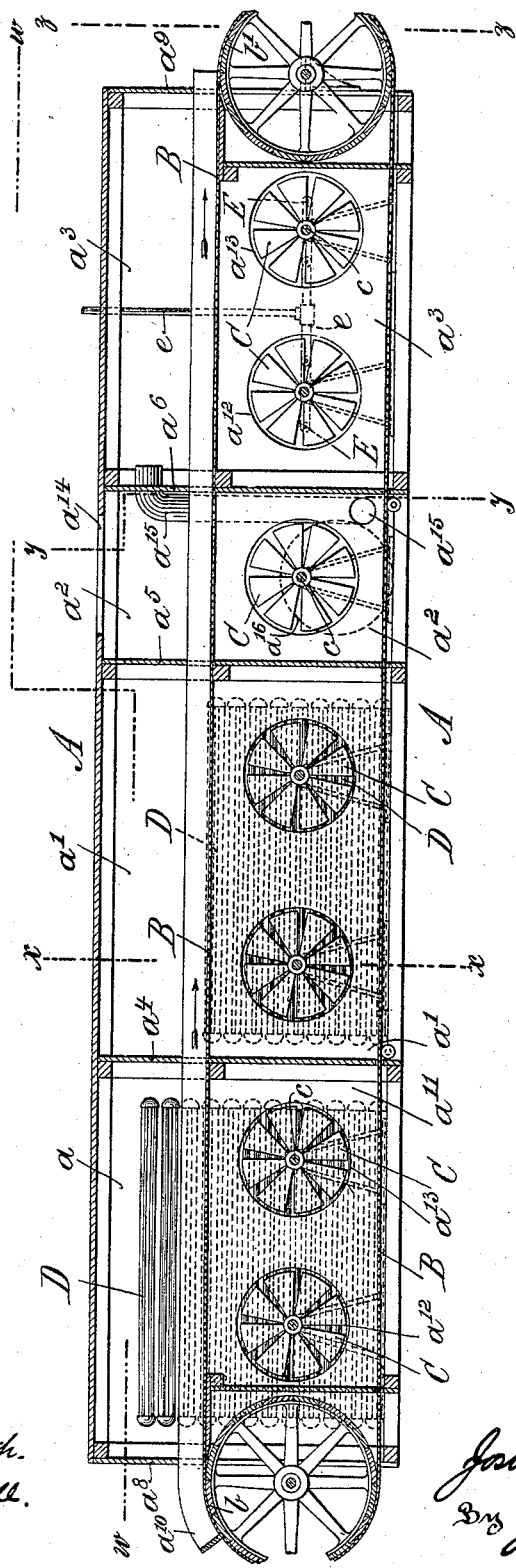
Figure 3:
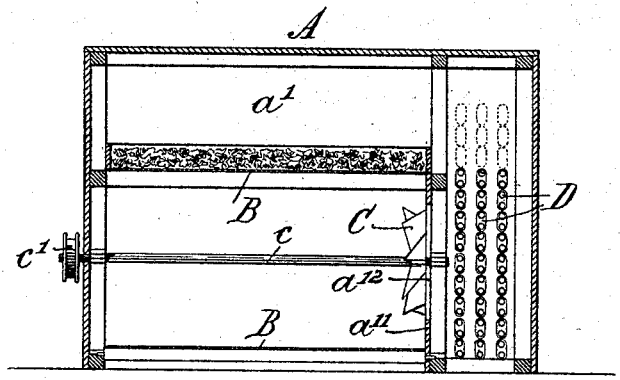
Figure 4:
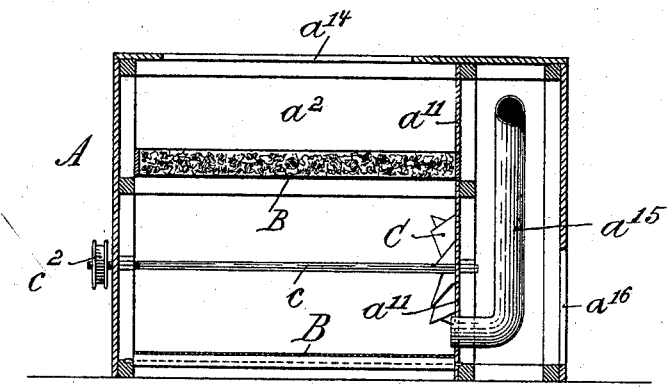
Figure 5:
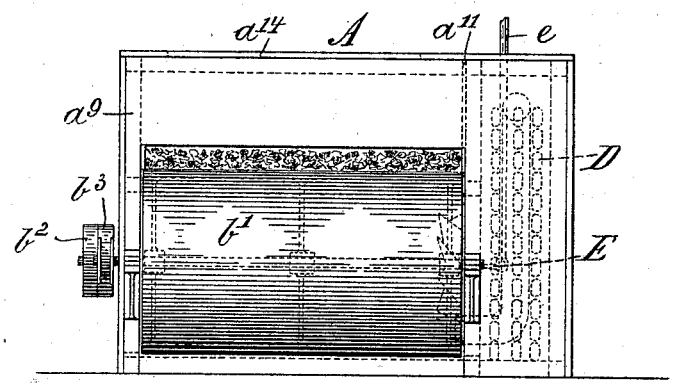

Figure 1 is a view, partly in plan and partly in section on the line $w\,w$ of Fig. 2, of an apparatus embodying the features of my invention. Fig. 2 is a vertical longitudinal section through an apparatus of my invention, showing the detail construction and arrangement of the internal parts thereof. Fig. 3 is a cross-section on the line $x\,x$ of Fig. 2. Fig. 4 is a similar view on the line $y\,y$ of Fig. 2, and Fig. 5 is a similar view on the line $z\,z$ of Fig. 2.

Referring to the drawings A, is the exterior case or shell constituting the housing of the apparatus. This housing is divided into four compartments $a$, $a'$, $a^2$ and $a^3$, separated from each other by means of partitions $a^4$, $a^5$ and $a^6$, and each provided with a cross-slit through which extends an endless conveyer B, of any suitable construction, but preferably made of meshed wire cloth engaging and traveling around drums $b$ and $b'$, suitably journaled to the walls $a^8$ and $a^9$, of the housing A. At one end of the housing A, is provided a hopper $a^{10}$, for the reception of tobacco or other similar matter to be conducted along the conveyer B, in the direction of the arrows through the series of chambers of the internal compartments of the apparatus. On one end of the shaft of the drum $b$, are provided loose and fast pulleys $b^2$ and $b^3$, as clearly illustrated in Fig. 5.

$a^{11}$, is a vertical partition formed in each of the compartments $a$, $a'$, $a^2$ and $a^3$, and each provided with openings $a^{12}$ and $a^{13}$. In these openings $a^{12}$ and $a^{13}$, are fan blowing or agitating appliances C, mounted on cross shafts $c$, provided on one of the ends thereof with pulleys $c'$, for engaging belts therewith so as to rotate said shafts and therewith said fan blowing or agitating devices C, to cause a circulation and recirculation of the air through the two chambers of the compartments $a$, as well as the compartments $a'$, $a^2$ and $a^3$, constituting respectively the treating, curing, cooling and ordering compartments of the apparatus.

In the tobacco treating compartments $a$, of the apparatus, wherein drying is effected, the communicating chambers thereof have in one of them a heating or steam coil D, and the number of coils in this department are preferably greater than in the compartment $a'$, in order that the tobacco may by circulation of the air first in one direction and then in the other be heated by said coils of pipe to a high temperature for a prescribed or definite length of time to absorb any moisture contained in the matter undergoing treatment therein and the arrangement of the fan blowing and agitating devices C, is such that a circulation and recirculation of this highly heated air can be readily obtained by simply manipulating the driving mechanism thereof, that is to say, causing the said devices to rotate first in one direction and then in the other.

In the tobacco curing compartment $a'$, of the apparatus, a less number of coils of pipe are mounted than in the treating compartment, but in other respects it is the same as that designated by $a$. This is done in order that a less highly heated temperature may be insured therein for completely curing the tobacco and which is utilized for bringing the tobacco to such a condition as to retain its flavor and aroma and to afford the highly desirable silky-like appearance being given thereto by such treatment of the same to the high temperature and then to the more moderate one in said compartment for a certain length of time.

In the cooling compartment $a^2$, is a fan blowing or agitating device mounted in the opening of the vertical partition on a cross-shaft $c$, extending through the housing A, and carrying a pulley $c^2$, as illustrated in Fig. 4. In the top of the said cooling compartment $a^2$, is provided an opening $a^{14}$, as illustrated in Figs. 2 and 4, for permitting air to be drawn into the two chambers of the compartment $a^2$, under the influence of the blowing device C, thereof.

$a^{15}$, is a pipe or conduit extending through the partition separating the cooling compartment $a^2$, from the ordering compartment $a^3$, and adapted to induce a suction from the latter compartment into the former compartment $a^2$, to obviate undue pressure of the moist air in the ordering compartment $a^3$, to be hereinafter more fully explained or escape of the moist air through any crevices in the walls or partitions of the said ordering compartment.

$a^{16}$, is an opening in the outer wall of the compartment $a^2$, leading to the chamber $a^{17}$, through which chamber extends the pipe $a^{15}$, the respective ends of which engage the partitions $a^{11}$ and $a^6$, separating the main chamber of the compartment $a^2$, from the chamber $a^{17}$, and the latter from the main chamber of the ordering compartment $a^3$. The said pipe $a^{15}$, is located below the suction fan C, of the main conveyer chamber of the compartment $a^2$. This fan C, it may be here remarked is so arranged and operates simply to draw the air in through the opening $a^{14}$, in the roof of the main chamber of the compartment $a^2$, in a downward direction through the mass or matter traveling by means of the conveyer B, through the main chamber thereof by suction and conveyed in an outward direction into and through the oblong narrow chamber $a^{17}$, and outward through the opening $a^{16}$, in the wall of this chamber, the said arrangement being such as to thoroughly cool said mass or matter from the treatment which it receives in the curing compartment $a'$, and anterior to the presentation of the matter or mass to the ordering compartment $a^3$, to be finally treated, as hereinafter more fully explained, and prior to the delivery of the same for use or working into different forms or conditions.

In the ordering compartment $a^3$, of the apparatus, in openings of the vertical partition separating the same into communicating chambers are mounted blowing devices or agitators C, mounted on shafts $c$, and operated by means of pulley and belt mechanism in substantially the manner hereinbefore explained. Arranged adjacent to the blowing or agitating devices C, is an atomizing appliance E, located at the ends of a T-pipe or tube $e$, extending downward through the roof of the housing A, and arranged so that in the rapid rotation of the fan blowers or agitators C, the mist discharged from the atomizing appliance E, is presented in the path of the agitated air and caused to thoroughly commingle therewith so as to produce a perfectly blent together humid atmosphere for presenting by circulation and recirculation to the tobacco traveling at a predetermined or defined rate of speed through one of the chambers of each of the compartments of the apparatus and which in its travel through the compartment $a^3$, is subjected to the influence of said humid atmosphere to completely order the same and by reason of the affinity which the tobacco has for the vapor of said atmosphere it is brought thereby to a condition to permit of handling of the same without crushing, crumbling or breaking thereof. The tobacco after having undergone the several steps hereinbefore explained is presented at the right hand end of the housing A, for being removed for working into cigars or into other forms for use.

Among the advantageous features of my invention are, first, that in the aforesaid apparatus the different steps are continuously, economically and efficiently carried into effect, and, second, the tobacco is treated, cured, cooled and ordered quickly without blanching or depriving the same of its flavor or aroma or interfering with the sweetness thereof and the leaves are given a silky-like appearance which is a highly desirable condition therefor.

Having thus described the nature and objects of my invention, what I claim as new, and desire to secure by Letters Patent, is—

1. An apparatus for treating tobacco, comprising a housing provided with a series of internal compartments separated from each other by partitions having openings therein, each compartment comprising two chambers, whereof in one chamber of two of said compartments heating coils are mounted, fan blowing or agitating devices mounted in the openings of said partitions, the third compartment being provided with an opening in the top of one of the chambers thereof and an opening in the wall of the other chamber of the same, suction means in an opening in a partition separating the two chambers of said compartment from each other, a fourth compartment provided with agitating and atomizing devices and means extending from a chamber of the fourth compartment into a chamber of the third compartment to prevent undue pressure of moist air in the former compartment, substantially as and for the purposes set forth.

2. An apparatus for treating tobacco, comprising a housing provided with a series of internal compartments separated from each other by partitions having openings therein, each compartment comprising two chambers, whereof in one chamber in two of said compartments heating coils are mounted, the third compartment provided with an opening in the top of one of the chambers thereof and an opening in the wall of the other chamber thereof, a suction fan in an opening in a partition separating the two chambers of said compartment from each other, a fourth compartment provided with an agitating and atomizing device, a suction pipe extending from the main chamber of the fourth compartment into the main chamber of the third compartment to prevent undue pressure of moist air in the fourth compartment, an endless conveyer extending through the main chamber of the series of compartments, and means for actuating the same, substantially as and for the purposes set forth.

3. An apparatus for treating tobacco, comprising a housing provided with four compartments, each of which is provided with two chambers separated by a partition provided with openings having agitating or blowing devices therein, two of said compartments, being the drying and curing compartments, arranged so that said devices cause a circulation and recirculation of air through each of the chambers of said compartments and in two of the chambers of said compartments are provided heating coils, the third or cooling compartment being provided with an opening in the top in direct communication with one of the chambers of said compartment, a suction fan mounted in the partition separating the said chamber from the outer chamber of said compartment having an opening in the wall thereof for the escape of air sucked and forced therethrough, the fourth or ordering compartment being provided with an atomizing appliance in one of the chambers and a blowing or agitating device located in proximity thereto and arranged so as to cause a circulation and recirculation of air or steam and air through the two chambers thereof, and a pipe extending through the partition separating the cooling compartment from the ordering compartment and into the main chamber of the cooling compartment beneath the suction fan of said chamber to prevent undue pressure of the moist atmosphere in the ordering compartment and also to relieve any pressure of the same therefrom, and an endless conveyer extending through openings of the partitions separating the several compartments from one another in said housing, substantially as and for the purposes set forth.

In testimony whereof I have hereunto set my signature in the presence of two subscribing witnesses.

JOSIAH K. PROCTOR.

Witnesses:
RICHARD C. MAXWELL,
LOUIS WINTERBERGER.